(12) United States Patent
Korn et al.

(10) Patent No.: US 6,917,680 B1
(45) Date of Patent: Jul. 12, 2005

(54) APPARATUS FOR DISABLING A TELEPHONE RINGER

(76) Inventors: Haley Korn, 159 E. 69th St., New York, NY (US) 10021; Jonathan Korn, 159 E. 69th St., New York, NY (US) 10021

( * ) Notice: Subject to any disclaimer, the term of this patent is extended or adjusted under 35 U.S.C. 154(b) by 0 days.

(21) Appl. No.: 09/248,436

(22) Filed: Feb. 11, 1999

(51) Int. Cl.$^7$ ............................................. H04M 1/00
(52) U.S. Cl. ........................... 379/373.01; 379/374.03
(58) Field of Search ........................... 379/37, 38, 47, 379/67.1, 74, 77, 88.2, 373.01, 373.02

(56) References Cited

U.S. PATENT DOCUMENTS

| | | | |
|---|---|---|---|
| 4,384,171 A | 5/1983 | Klee | 179/84 C |
| 4,405,839 A | 9/1983 | Groff | 179/84 C |
| 4,446,334 A | 5/1984 | Groff | 179/81 R |
| 4,480,154 A | 10/1984 | Klee | 179/84 CC |
| 4,791,664 A | 12/1988 | Lutz et al. | 379/199 |
| 4,845,743 A | 7/1989 | Lutz | 379/199 |
| 4,924,499 A | 5/1990 | Serby | 379/200 |
| 5,131,030 A * | 7/1992 | Cameron | 379/373.01 |
| 5,191,607 A | 3/1993 | Meyers et al. | 379/421 |
| 5,317,632 A | 5/1994 | Ellison | 379/199 |
| 5,448,630 A | 9/1995 | Barstow | 379/199 |
| 5,604,797 A | 2/1997 | Adcock | 379/373 |

OTHER PUBLICATIONS

WO 97/16932 Kikinis, Selective notification method for protable electronic devices, May 1997.*

* cited by examiner

Primary Examiner—Forester W. Isen
Assistant Examiner—Jefferey Harold
(74) Attorney, Agent, or Firm—Amster, Rothstein & Ebenstein LLP

(57) ABSTRACT

An apparatus for disabling a telephone ringer includes a light sensing device operable to produce a signal indicative of a level of ambient light; and a controller operable to receive the signal and disable the telephone ringer when the signal indicates that the ambient light has reached a predetermined level.

27 Claims, 2 Drawing Sheets

APPARATUS FOR DISABLING A TELEPHONE RINGER

BACKGROUND OF THE INVENTION

1. Field of the Invention

This invention generally relates to an apparatus for controlling a telephone and, more particularly, to an apparatus that includes a device sensitive to light in communication with a controller so that in response to ambient light below a predetermined level, said device provides a signal to said controller which then disables the telephone ringer.

2. Related Art

With ever expanding telephone usage, we are increasingly inundated with unwanted telephone calls. Anyone who has been startled awake at night by a "wrong number" knows that it is desirable for telephone subscribers to be able to disable the ringer mechanism of their telephones when they do not want to be disturbed. Thus, one could elect to disable a telephone's ringer while sleeping, eating, bathing, or simply while engaged in a quiet activity. Prior to modern modular telephone connections, the only method of silencing a telephone's ringer was to turn down the ringer's volume, or leave the receiver off of the hook. Now, one can simply disconnect the modular plug from the telephone itself or from the wall jack. With the telephone disconnected, the caller would hear a ring signal and assume the person called is not in, while the person called hears nothing.

There are, however, numerous problems associated with disconnecting a telephone's modular plug. First, this method requires the user to remember to employ the remedy. In addition, the user must also remember to reconnect the modular plug to reinstate telephone service. Thus, disabling a telephone's ringer via pulling its modular plug is subject to the same risks and problems that are associated with turning the ringer's volume down or leaving the receiver off the hook. People forget and, thus, receive calls at unwanted times or miss calls they are willing to receive.

Over the years, people have attempted to solve the problems addressed by this invention in numerous ways. For example, timers have been used in combination with telephone silencers to disable a telephone for time periods when the user does not wish to be disturbed. Similarly, there are commercial devices available that have on-off switches that allow a telephone ringer to be enabled and disabled. However, these too require that the user remember to employ the remedy in order to avoid phone calls, and then remember to reactivate it when willing to receive calls. Consequently, there is a need for an apparatus that selectively enables and disables a telephone ringer.

SUMMARY OF THE INVENTION

In order to overcome the disadvantages of the prior art, the present invention includes a light sensing device operable to produce a signal indicative of a level of ambient light; and a controller operable to receive the signal and disable the telephone ringer when the signal indicates that the ambient light has reached a predetermined level.

According to another aspect of the present invention, an apparatus for disabling a telephone ringer includes a light sensing device operable to produce a first signal indicative of a level of ambient light; a timing device operable to produce a second signal indicative of a timing condition; and a controller operable to receive the first and second signals and disable the telephone ringer when either (i) the first signal indicates that the ambient light has reached a predetermined level, or (ii) the second signal indicates that a predetermined timing condition has been satisfied.

According to a further aspect of the present invention, an apparatus for disabling a telephone ringer includes a light sensing device operable to produce a first signal indicative of a level of ambient light; a timing device operable to produce a second signal indicative of a timing condition; a controller operable to receive the first and second signals and disable the telephone ringer when either (i) the first signal indicates that the ambient light has reached a predetermined level, or (ii) the second signal indicates that a predetermined timing condition has been satisfied; and a recording device operable to communicate with the controller and play back a recording to a calling party.

According to still another aspect of the present invention, an apparatus for disabling a telephone ringer includes a light sensing device operable to produce a first signal indicative of a level of ambient light; a timing device operable to produce a second signal indicative of a timing condition; a recording device operable to play back a recording to a calling party, the recording prompting the calling party to provide indicia that the call is a priority call; and a controller communicating with the light sensing device, the timing device and the recording device, the controller being operable to receive the first and second signals and both (i) disable the telephone ringer, and (ii) enable the recording device such that the recording device may play back the recording to the calling party, when either (i) the first signal indicates that the ambient light has reached a predetermined level, or (ii) the second signal indicates that a predetermined timing condition has been satisfied, the controller being operable to initiate an emergency sequence when the indicia indicates that the call is a priority call.

Additional objects, features and advantages of the present invention will become apparent from the following description and the appended claims, taken in connection with the accompanying drawing.

BRIEF DESCRIPTION OF THE DRAWINGS

For the purpose of illustrating the invention, there are shown in the drawing forms which are presently preferred, it being understood, however, that the invention is not limited to the precise arrangements and instrumentalities shown.

DETAILED DESCRIPTION OF THE INVENTION

Figure 1:
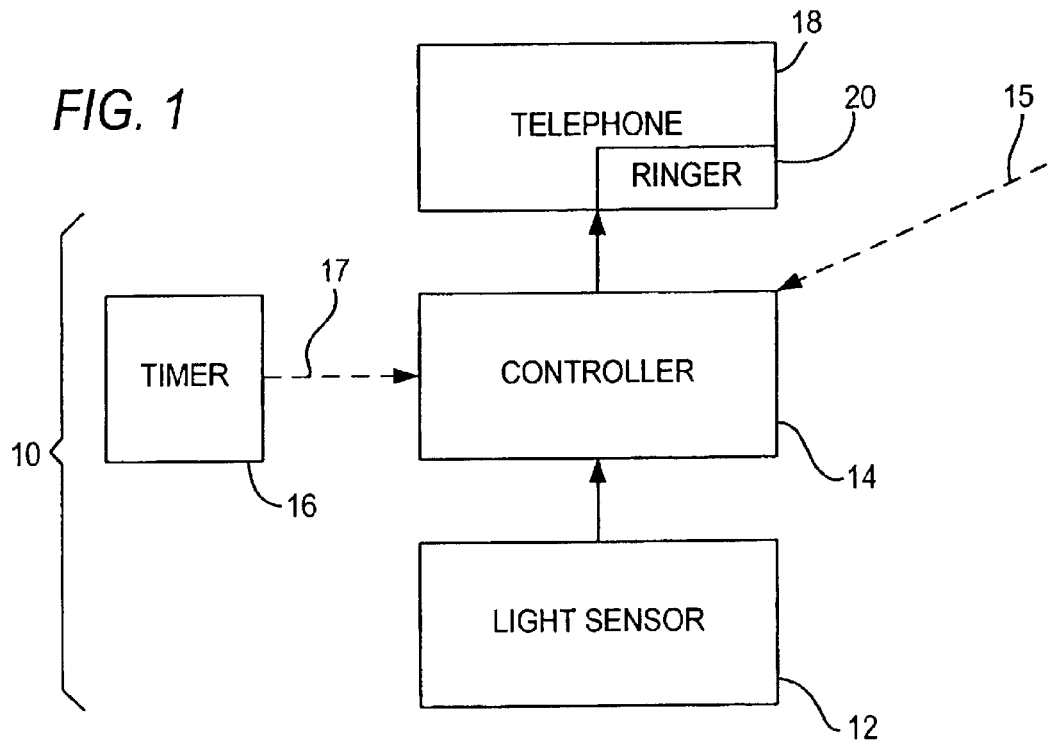
FIG. 1 is a block diagram of an apparatus for disabling a telephone ringer in accordance with at least one aspect the present invention.

Referring now to the drawing wherein like numerals indicate like elements, there is shown in FIG. 1 a first embodiment of the present invention. Apparatus 10 is a telephone controlling system which includes light sensor 12, controller 14 and timer 16 as shown. Both the light sensor 12 and timer 16 communicate with controller 14 which in turn is coupled to an incoming/outgoing telephone line 15 and serves to enable and disable ringer 20 of telephone 18.

While timer 16 is shown in this embodiment, it will be appreciated by those of ordinary skill in the art that timer 16 need not be included in apparatus 10. That is, apparatus 10 could merely consist of light sensor 12 and controller 14 in communication with telephone 18 and ringer 20. Accordingly, connection 17 between timer 16 and controller 14 is shown as a dashed line.

Light sensor 12 may be a photovoltaic cell, a photo-transistor, a photo-resistor or other photo-sensitive component known in the art. As the level of ambient light changes, light sensor 12 provides controller 14 with a first signal which changes in accordance with the level of ambient light. When the ambient light reaches a predetermined level (preferably falling below a predetermined level), controller 14 will recognize that light sensor 12 is sending a first signal indicating that the ringer 20 should be disabled. The controller 14 will preferably respond to the first signal by disabling ringer 20 of telephone 18.

Timer 16 may be a clock timer (such as a digital clock circuit) that provides a second signal to controller 14 indicative of a timing condition or set of conditions. For example, the second signal may be representative of periodic pre-set times at which the controller 14 should sequentially enable and disable ringer 20 of telephone 18. Alternatively, timer 16 may be a multi-day clock timer and provide a second signal to controller 14 indicating that at varying times on varying days the ringer 20 of telephone 18 should be enabled and disabled.

In apparatus 10, controller 14 will enable and disable ringer 20 of telephone 18 in response to a first signal from light sensor 12 and/or a second signal from timer 16. Those of ordinary skill in the art, however, will appreciate that controller 14 could be adapted in such a manner to be responsive only to the first signal from light sensor 12 or the second signal from timer 16.

Figure 2:
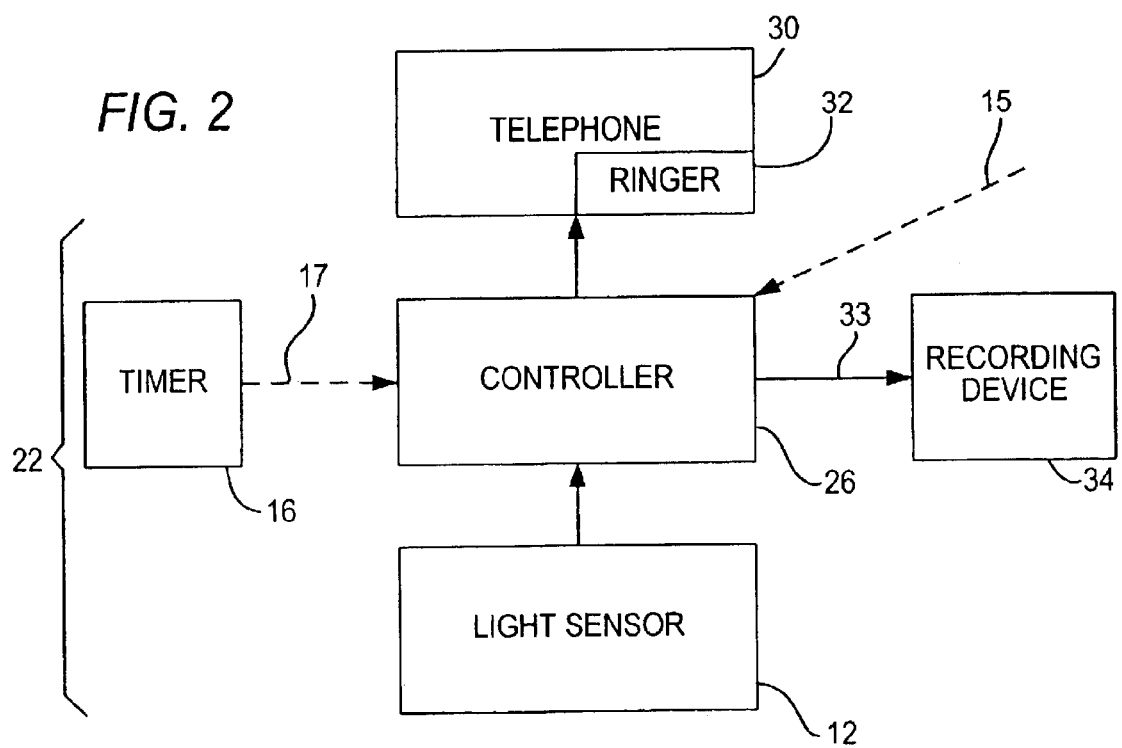
FIG. 2 is a block diagram of an apparatus for disabling a telephone ringer in accordance with another aspect of the present invention.

Another embodiment of the present invention is shown in FIG. 2 and includes light sensor 12 and timer 16 in communication with controller 26. Light sensor 12 may be a photovoltaic cell, a photo-transistor a photo-resistor or other photo-sensitive component as discussed above with respect to apparatus 10. Timer 16 is preferably substantially the same as timer 16 of FIG. 1.

Unlike apparatus 10 in FIG. 1, apparatus 22 of FIG. 2 includes a recording device 34. Recording device 34 may be in the form of an answering machine, answering service or the like. In the embodiment of the present invention shown in FIG. 2, controller 26 coupled to incoming/outgoing telephone line 15 preferably disables ringer 32 of telephone 30 and enables recording device 34 (via signal line 33) to answer any incoming phone calls in response to a first signal from light sensor 12 and/or second signal from timer 16.

Preferably, recording device 34 is capable of playing back a recording to a calling party and is also capable of receiving and retaining a message from the calling party.

Figure 3:
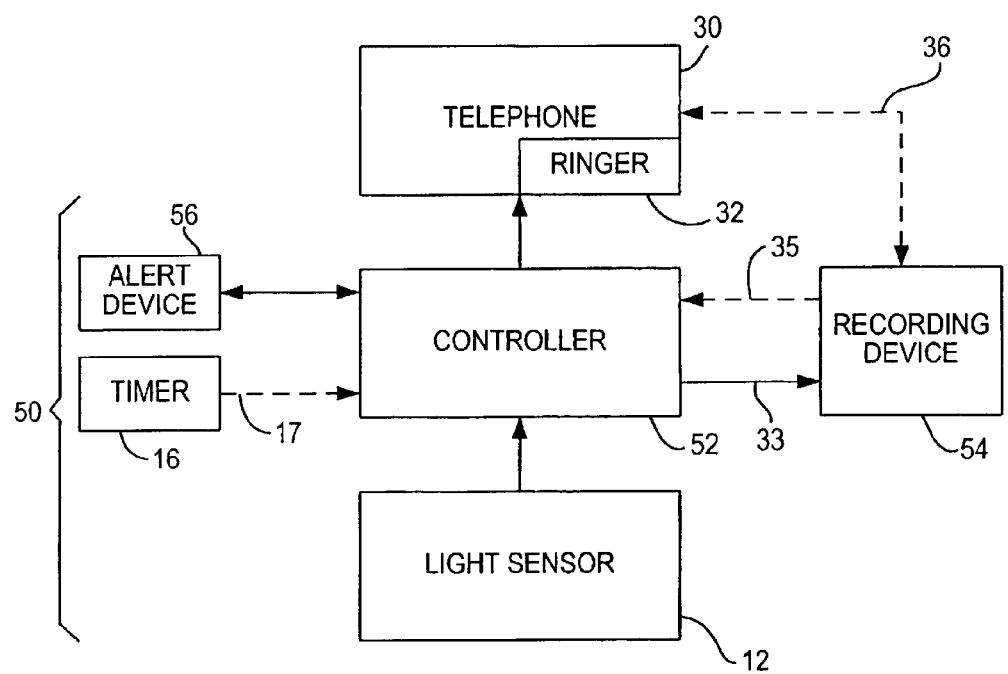
FIG. 3 is a block diagram of an apparatus for disabling a telephone ringer in accordance with yet another aspect of the present invention.

Reference is now made to FIG. 3 which shows an alternative embodiment of the present invention designated as apparatus 50. Apparatus 50 is a telephone controlling system coupled to incoming/outgoing telephone line 15 which includes light sensor 12, timer 16 and recording device 54 in communication with controller 52. Timer 16 and light sensor 12 are substantially similar to timers and light sensors, respectively, of the previous embodiments of the present invention. As was the case with the previous embodiments of the present invention, controller 52 operates to disable ringer 32 of telephone 30 in response to first and/or second signals from light sensor 12 and timer 16, respectively.

Recording device 54 is preferably operable to play back a recording to a calling party which states, in pertinent part, "if this is an emergency, press '*'." This recording is provided to controller 52 via signal line 35 and, thereafter, to the calling party over the telephone line (not shown). Therefore, the calling party can opt to press the '*' button on his or her telephone handset to initiate an emergency sequence (or indicate that the call is a priority call). It is noted that the recording provided to the calling party may take on many forms as will be apparent to one skilled in the art from the above teaching. Further, one skilled in the art will recognize that it is not necessary to utilize the '*' button of the telephone as indicia that the emergency sequence should be initiated and that other means of initiating the emergency sequence are available (such as using other keypad buttons or sequences of keypad buttons).

Should the calling party choose to initiate the emergency sequence by pressing the '*' button on his or her keypad, the controller 52 may take one or more actions. In particular, the controller 52 may reactivate ringer 32 of telephone 30 such that telephone 30 rings and the user is alerted that an emergency telephone call is being received. Alternatively, (assuming the recording provided to the calling party also states that a message should be left by the calling party) controller 52 may activate recording device 54 to record the calling party's message and then terminate the calling party's connection to telephone 30. Thereafter, controller 52 may alert the user by other means, such as subsequently enabling ringer 32 or enabling an alert device 56 which indicates that an emergency call has been received. Alert device 56 may be a ringer, a light emitting device, or the like.

One skilled in the art will appreciate from the teaching herein that the controller 52 need not directly control recording device 54 if the recording device 54 is designed to automatically answer incoming calls irrespective of whether ringer 32 has been disabled by controller 52. Indeed, known answering machines may be coupled to a telephone line (not shown) which will answer incoming calls without input from controller 52. Generally, such answering machines (if used for recording device 54) may communicate with telephone 30 via its input jack as shown by dashed signal line 36. However, when controller 26 is in communication with telephone 30 via its input jack and recording device 30 is directly connected to the telephone line, then recording device 34 may communicate with controller 54 via signal line 35 such that telephone 30 may access the telephone line.

While the invention as discussed above is generally directed to an apparatus that may by inserted between an input of a telephone (e.g., the input jack to the telephone) and the telephone line (e.g. a modular plug coming from the ring/tip connections of the telephone line), those of ordinary skill in the art will appreciate that the present invention may be used in conjunction with a number of appliances. Indeed, the invention can be incorporated into a telephone answering machine, as well as alarm clocks, and other devices. A complete telephone can even be constructed that contains the invention internally (e.g., integrally). In addition, the invention could also be inserted immediately after the interface of one's incoming phone service in order to control all of the phones in a house or office. Further, one skilled in the art will recognize that timers 16, 16 may be integral to respective controllers 14, 26, 52.

The foregoing description of the preferred embodiments of the present invention have been provided for the purpose of illustration and description. They are not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. An apparatus for disabling a telephone ringer comprising:
   a light sensing device operable to produce a signal indicative of a level of ambient light;
   a recording device operable to play back a recording to a calling party, the recording prompting the calling party to provide indicia that the call is a priority call; and
   a controller communicating with the light sensing device and the recording device, the controller being operable to receive the signal and both (I) to disable the telephone ringer, and (ii) enable the recording device such that the recording device may play back the recording to the calling party, when the signal indicates that the ambient light has reached a predetermined level, the controller being operable to initiate an emergency sequence when the indicia indicates that the call is a priority call.

2. The apparatus according to claim 1, wherein the emergency sequence includes enabling the telephone ringer irrespective of whether the signal indicates that the ambient light has reached the predetermined level.

3. The apparatus according to claim 1, further comprising an alert device in communication with the controller, the controller activating the alert device when the indicia indicates that the call is a priority call.

4. The apparatus according to claim 1, wherein the recording prompts the calling party to press a telephone keypad button to indicate that the call is a priority call, the controller being operable to recognize the pressed telephone keypad button such that the emergency sequence is initiated.

5. The apparatus according to claim 1, wherein the recording device is operable to receive and retain a message from the calling party.

6. The apparatus according to claim 1, wherein the controller is operable to disable the telephone ringer and enable the recording device when the signal indicates that the ambient light has fallen below a predetermined threshold.

7. The apparatus according in claim 1, wherein the light sensing device is taken from the group consisting of a photovoltaic cell, a photo-transistor and a photo-resistor.

8. The apparatus according in claim 1, wherein the light sensing device, recording device and controller are external to the telephone and the controller is operable to couple between a telephone line and an input connection of the telephone.

9. The apparatus according in claim 1, wherein the light sensing device and controller are integral with the telephone.

10. An apparatus for disabling a telephone ringer comprising:
    a light sensing device operable to produce a first signal indicative of a level of ambient light;
    a timing-device operable to produce a second signal indicative of a timing condition;
    a recording device operable to play back a recording to a calling party, the recording prompting the calling party to provide indicia that the call is a priority call; and
    a controller communicating with the light sensing device, the timing device and the recording device, the controller being operable to receive the first and second signals and both (i) disable the telephone ringer, and (ii) enable the recording device such that the recording device may play back the recording to the calling party, when either (i) the first signal indicates that the ambient light has reached a predetermined level, or (ii) the second signal indicates that a predetermined timing condition has been satisfied, the controller being operable to initiate an emergency sequence when the indicia indicates that the call is a priority call.

11. The apparatus according to claim 10, wherein the emergency sequence includes enabling the telephone ringer irrespective of whether either of the first and second signals indicates that the telephone ringer should be disabled.

12. The apparatus according to claim 10, further comprising an alert device in communication with the controller, the controller activating the alert device when the indicia indicates that the call is a priority call.

13. The apparatus according to claim 10, wherein the recording prompts the calling party to press a telephone keypad button to indicate that the call is a priority call, the controller being operable to recognize the pressed telephone keypad button such that the emergency sequence is initiated.

14. The apparatus according to claim 10, wherein the recording device is operable to receive and retain a message from the calling party.

15. The apparatus according to claim 10, wherein the controller is operable to disable the telephone ringer and enable the recording device when the signal indicates that the ambient light has fallen below a predetermined threshold.

16. The apparatus according in claim 10, wherein the light sensing device is taken from the group consisting of a photovoltaic cell, a photo-transistor and a photo-resistor.

17. The apparatus according in claim 10, wherein the light sensing device, timing device, recording device and controller are external to the telephone and the controller is operable to couple between a telephone line and an input connection of the telephone.

18. The apparatus according in claim 10, wherein the light sensing device, timing device and controller are integral with the telephone.

19. The apparatus according to claim 10, wherein the timing device is operable to provide the second signal to the controller to indicate that the telephone ringer is to be sequentially disabled and enabled at periodic pre-set times.

20. The apparatus according to claim 10, wherein the timing device is operable to provide the second signal to the controller to indicate that the telephone ringer is to be sequentially disabled and enabled at varying times on varying days.

21. The apparatus according to claim 10, wherein the timing device is integral with the controller.

22. An apparatus for disabling a telephone ringer comprising:
    a recording device operable with a telephone to play back an instruction recording to a calling party, the recording prompting the calling party to provide designated signal that the calling party's call is a priority call; and
    a controller communicating with said recording device, said controller being operable;
    (i) to disable the telephone ringer; and
    (ii) to enable the recording device such that the recording device may play back said instruction recording to a calling party, the controller being operable after a calling party provides said designated signal to initiate an emergency sequence and re-enable the ringer when said signal from the calling party indicates that the calling party's call is a priority call.

23. The apparatus according to claim 22, wherein the recording prompts the calling party to speak a designated command to indicate that the call is a priority call, the controller being operable to recognize said spoken designated command such that said emergency sequence is initiated.

24. Apparatus operable with a telephone including a ringer and a telephone answering device (TAD), comprising:
   (i) a controller adapted for connection with said telephone and said TAD for selectively disabling the telephone ringer and connecting the TAD to receive the call and to deliver a playback message to the caller with instruction for the caller to override the ringer disablement so that the telephone will ring if said call is a priority call,
   (ii) said TAD adapted to provide an instruction to the caller to use his/her telephone key pad or to speak into his phone microphone a designated code indicating that the calling party's call is a priority call,
      said controller, when it receives said code, adapted to override said disablement of said ringer and allow said call to activate said ringer so that the call can be received,
   (iii) a timing device electronically coupled to said controller and operable to produce a first signal indicative of a preselected timing condition (such as 11:00 PM turn off time) for which said controller is to automatically disable said ringer and enable the TAD for providing its instruction playback, and
   (iv) a light sensing device electronically coupled to said controller and operable to produce a second signal indicative of a preselected level of ambient light (such as lights out or darkness condition) for which said controller is to automatically disable said ringer and enable the TAD for providing its instruction playback,
      said controller adapted for the following conditions:
      (a) where said timing device is activated and said light sensing device is not activated, to receive and respond to said first signal from said timing device and to disable said ringer, or
      (b) where said light sensing device is activated and said timing device is not activated, to receive and respond to said second signal from said light sensing device and to disable said ringer, or
      (c) where both said timing device and said light sensing device are activated, to receive said first signal (such as 11:00 PM turn off time) and to disable said ringer, but to disregard said first signal if the second signal (such as lights out or darkness condition) is not yet been received, or
      (d) where both said timing device and said light sensing device are activated, to receive said second signal (such as lights out or darkness condition) and to disable said ringer, but to disregard said second signal if said first signal has not yet been received, or
      (e) where neither said timing device nor said light sensing device is activated, to respond to manual switching to disable said ringer.

25. Apparatus according to claim 24 wherein said timing device has a second preselected timing condition to automatically enable said disabled ringer.

26. Apparatus according to claim 24 wherein said light sensing device has a second preselected level of ambient light to automatically enable said disabled ringer.

27. A telephone answering system, comprising:
   (i) a telephone including a ringer,
   (ii) a telephone answering device (TAD), and
   (iii) a controller adapted for connection with said telephone and said TAD for selectively disabling the telephone ringer and connecting the TAD to receive the call and to deliver a playback message to the caller with instruction for the caller to override the ringer disablement so that the telephone will ring if said call is a priority call,
      said TAD adapted to provide an instruction to the caller to use his/her telephone key pad or to speak into his phone microphone a designated code indicating that the calling party's call is a priority call,
      said controller, when it receives said code, adapted to override said disablement of said ringer and allow said call to activate said ringer so that the call can be received,
   (iv) a timing device electronically coupled to said controller and operable to produce a first signal indicative of a preselected timing condition (such as 11:00 PM turn off time) for which said controller is to automatically disable said ringer and enable the TAD for providing its instruction playback, and
   (v) a light sensing device electronically coupled to said controller and operable to produce a second signal indicative of a preselected level of ambient light (such as lights out darkness condition) for which said controller is to automatically disable said ringer and enable the TAD for providing its instruction playback,
      said controller adapted for the following conditions:
      (a) where said timing device is activated and said light sensing device is not activated, to receive and respond to said first signal from said timing device, or
      (b) where said light sensing device is activated and said timing device is not activated, to receive and respond to said second signal from said light sensing device, or
      (c) where both said timing device and said light sensing device are activated, to receive said first signal (such as 11:00 PM turn off time) and to disable said ringer, but to disregard said first signal if the second signal (such as lights out or darkness condition) is not yet been received, or
      (d) where both said timing device and said light sensing device are activated, to receive said second signal (such as lights out or darkness condition) electronically coupled to said controller and to disregard said second signal of said first signal has not yet been received, or
      (e) where neither said timing device nor said light sensing device is activated, to respond to manual switching to disable said rings.

* * * * *

UNITED STATES PATENT AND TRADEMARK OFFICE
CERTIFICATE OF CORRECTION

PATENT NO. : 6,917,680 B1
DATED : July 12, 2005
INVENTOR(S) : Hayley Korn and Jonathan Korn It is certified that error appears in the above-identified patent and that said Letters Patent is hereby corrected as shown below:

<u>Title page,</u>
Item [75], Inventor, the first inventor's name should read as follows:
-- Hayley Korn --.

Signed and Sealed this

Thirtieth Day of August, 2005

JON W. DUDAS
*Director of the United States Patent and Trademark Office*